United States Patent [19]

Allerding et al.

[11] Patent Number: 5,255,946
[45] Date of Patent: Oct. 26, 1993

[54] APPARATUS FOR LOCKING AND UNLOCKING A FLAP DOOR

[75] Inventors: Volker Allerding; Thorsten Teichmann, both of Bremen; Albrecht Seelhorst, Glashuetten-Schlossborn, all of Fed. Rep. of Germany

[73] Assignee: Deutsche Aerospace Airbus GmbH, Hamburg, Fed. Rep. of Germany

[21] Appl. No.: 992,611

[22] Filed: Dec. 18, 1992

Related U.S. Application Data

[63] Continuation-in-part of Ser. No. 825,627, Jan. 24, 1992, Pat. No. 5,180,199.

[30] Foreign Application Priority Data

Jan. 26, 1991 [DE] Fed. Rep. of Germany ....... 4102272
Dec. 20, 1991 [DE] Fed. Rep. of Germany ....... 4142312

[51] Int. Cl.$^5$ .............................................. E05C 17/12
[52] U.S. Cl. ........................ 292/259 R; 292/DIG. 72
[58] Field of Search ...................... 292/30, 48, 53, 193, 292/218, 241, 257, 259, DIG. 30, DIG. 71, DIG. 72

[56] References Cited

U.S. PATENT DOCUMENTS

| 1,489,981 | 4/1924 | Copeman | 292/239 |
| 1,820,238 | 8/1931 | Mears et al. | 292/48 X |
| 1,935,001 | 11/1933 | Webster | 292/259 X |
| 3,039,837 | 6/1962 | Poe | 292/DIG. 30 X |
| 3,724,130 | 4/1973 | Bogue | 292/259 X |
| 3,761,135 | 9/1973 | Mundinger et al. | 292/259 X |
| 5,135,271 | 8/1992 | Bestwick | 292/DIG. 72 X |

FOREIGN PATENT DOCUMENTS 723453 7/1939 Fed. Rep. of Germany .
4102272 1/1991 Fed. Rep. of Germany .

Primary Examiner—Richard E. Moore
Attorney, Agent, or Firm—W. G. Fasse

[57] ABSTRACT

A flap door in the floor of an aircraft cabin has a mechanism for locking and unlocking the flap door from either side. A bearing block with a bellcrank lever pivoted to the block is attached to the flap door that hinges upwardly into the passenger cabin. The bellcrank lever is one-armed and has a lateral roller that engages into a lateral guide groove. Further, a locking member is provided on the one-armed bellcrank lever, which catches behind a spring biased stop member on the bearing block in the closed position of the flap door. A handle recessed in the upwardly facing surface of the flap door is connected through a flexible pull member for withdrawing the stop member out of its locking position to open the door from above.

7 Claims, 3 Drawing Sheets

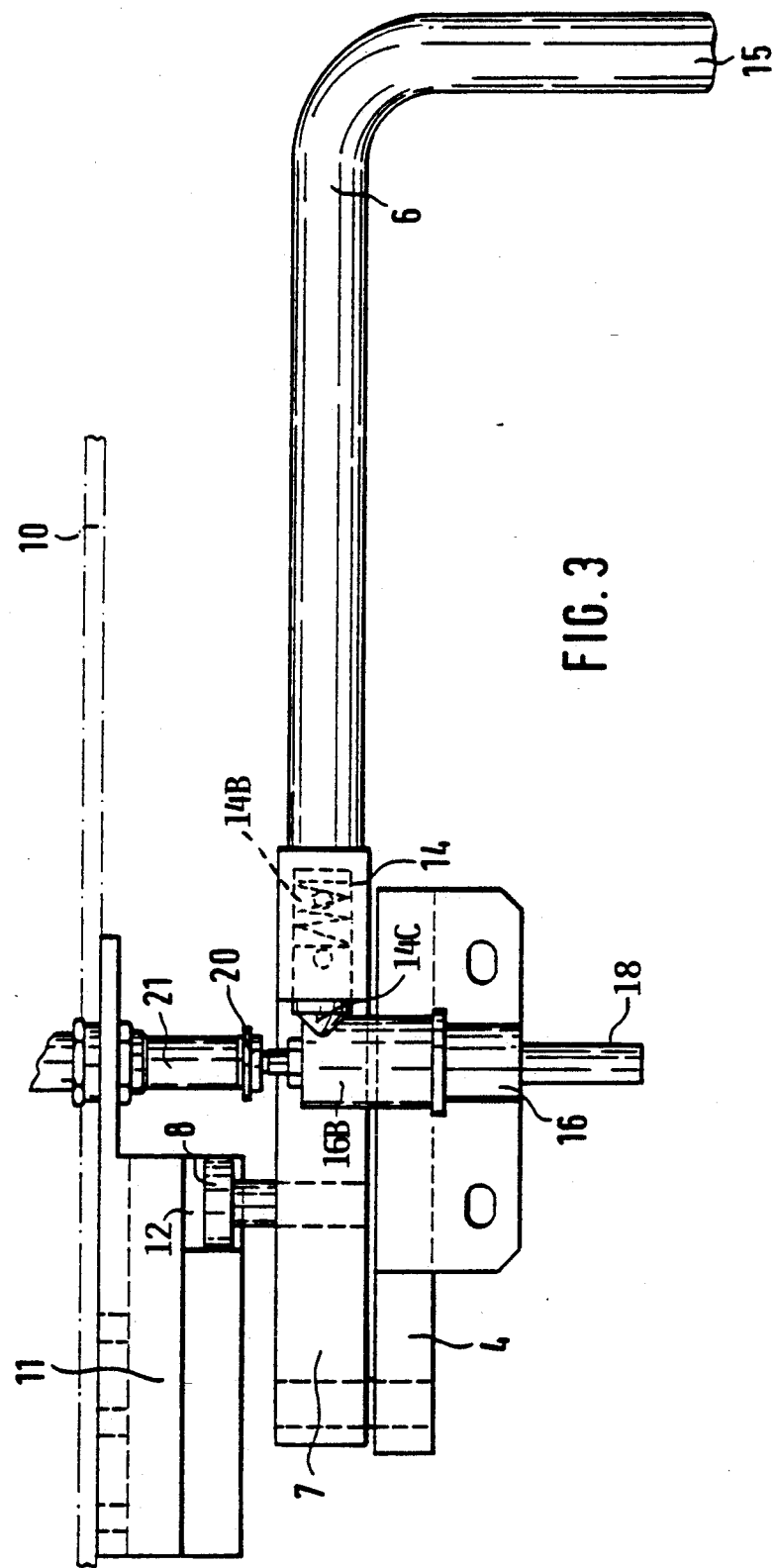

APPARATUS FOR LOCKING AND UNLOCKING A FLAP DOOR

CROSS-REFERENCE TO RELATED APPLICATION

The present application is a Continuation-In-Part application of copending application USSN: 07/825,627, filed on Jan. 24, 1992, by inventors Thorsten Teichmann and Volker Allerding, now U.S. Pat. No. 5,180,199 issued Jan. 19, 1993.

FIELD OF THE INVENTION

The invention relates to an apparatus for locking and unlocking a flap door that is located in the floor of the passenger cabin of a commercial aircraft, which flap door leads to a cargo hold or lounge room in the space below the floor.

BACKGROUND INFORMATION

German Patent Publication P 41 02 272, corresponding to the above U.S. Ser. No. 07/825,627, discloses a flap door, wherein a bearing block with a bellcrank lever jointed to it, is attached to the flap door that swivels or tilts into the passenger cabin. The bellcrank lever has one lever arm formed as a handle and another lever arm has a roller which catches into a locking member in the closed position and which rolls off a supporting edge when the flap door is opened.

In the apparatus of the above mentioned U.S. Ser. No.: 07/825,627, the locking of the flap door is achieved with the roller that is attached to one lever arm, whereby the roller engages a biased locking member that surrounds the roller. During opening of the flap door, after overcoming the locking bias force, the roller is supported by a supporting edge by rolling along the supporting edge, whereby the flap door can also be opened against outside obstacles. Such an apparatus thus makes it possible in commercial aircraft for additional pilots or flight attendants to travel along in suitably prepared rooms in the cargo hold which are accessible through flap doors, especially on long-distance flights. The replacement crew can leave these rooms by the flap doors when needed and the original crew can go through these doors to rest in the lower quarters.

OBJECTS OF THE INVENTION

The present invention is based on the above described apparatus of the parent case and has for its object a further improvement for such flap door locking devices by providing a mechanism for improving the safety of such flap doors and for opening the flap door from either side, if necessary.

SUMMARY OF THE INVENTION

According to the invention the present flap door locking and unlocking mechanism comprises a bellcrank mechanism including a one-armed lever jointed or pivoted with one end to a bearing block and reaching with a roller attached at a spacing from the pivot joint on the bearing block, into a lateral guide groove acting as a support edge during opening and closing of the flap door, and wherein the one-armed lever carries a spring-loaded locking member, which catches in the closed position of the flap door behind a stop member attached to the bearing block.

In the apparatus according to the invention, the guide groove with its lateral edge acts as a supporting edge for the roller which is simultaneously held in the groove in the closed and locked position of the flap door. The guide groove is located in a bracket attached laterally to the frame of the flap door, whereby the guide groove runs parallel to the floor or deck of the aircraft. The guide groove has an entrance curve section and a passage for the roller to enter into the guide groove.

The apparatus of the present invention also allows unlocking the flap door from the outer side, that is, from the floor side in the passenger cabin. For this purpose, the laterally slideable stop member is spring biased or elastically supported and coupled with an operating member attached to the flap door on the floor side thereof. Further, the stop member is preferably provided with a switch actuating member, that influences a proximity switch to provide information regarding the position of the flap door in the closed position and in the open position of the flap door.

BRIEF DESCRIPTION OF THE DRAWINGS

In order that the invention may be clearly understood, it will now be described, by way of example, with reference to the accompanying drawings, wherein:

FIG. 3 is a plan view of the present apparatus in the closed position of the flap door.

DETAILED DESCRIPTION OF THE PREFERRED EXAMPLE EMBODIMENTS AND OF THE BEST MODE OF THE INVENTION

Figure 1:
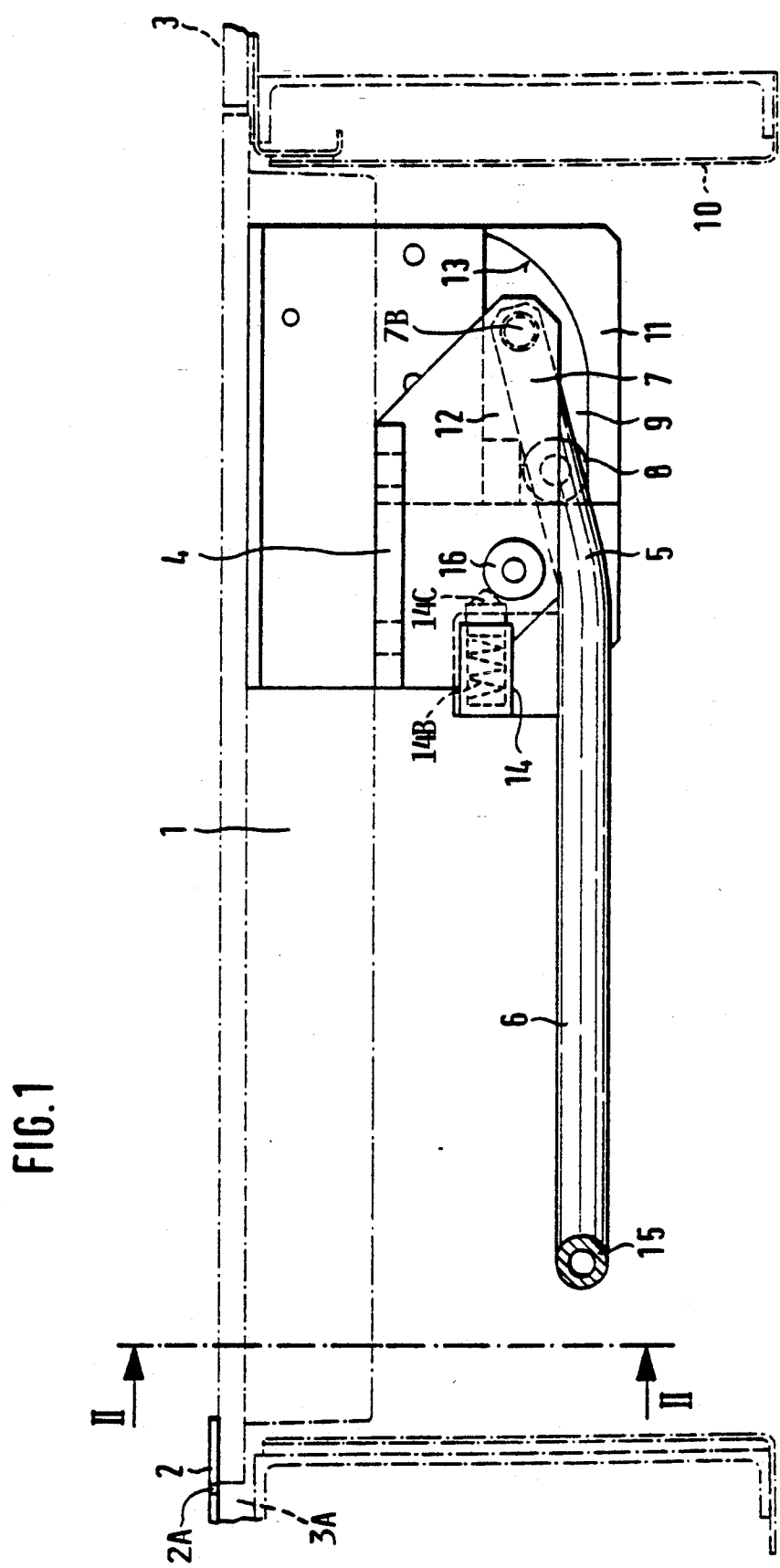
FIG. 1 shows a side view of a flap door locking mechanism of the invention, with the flap door shown by dash-dotted lines in the closed position.
Figure 2:
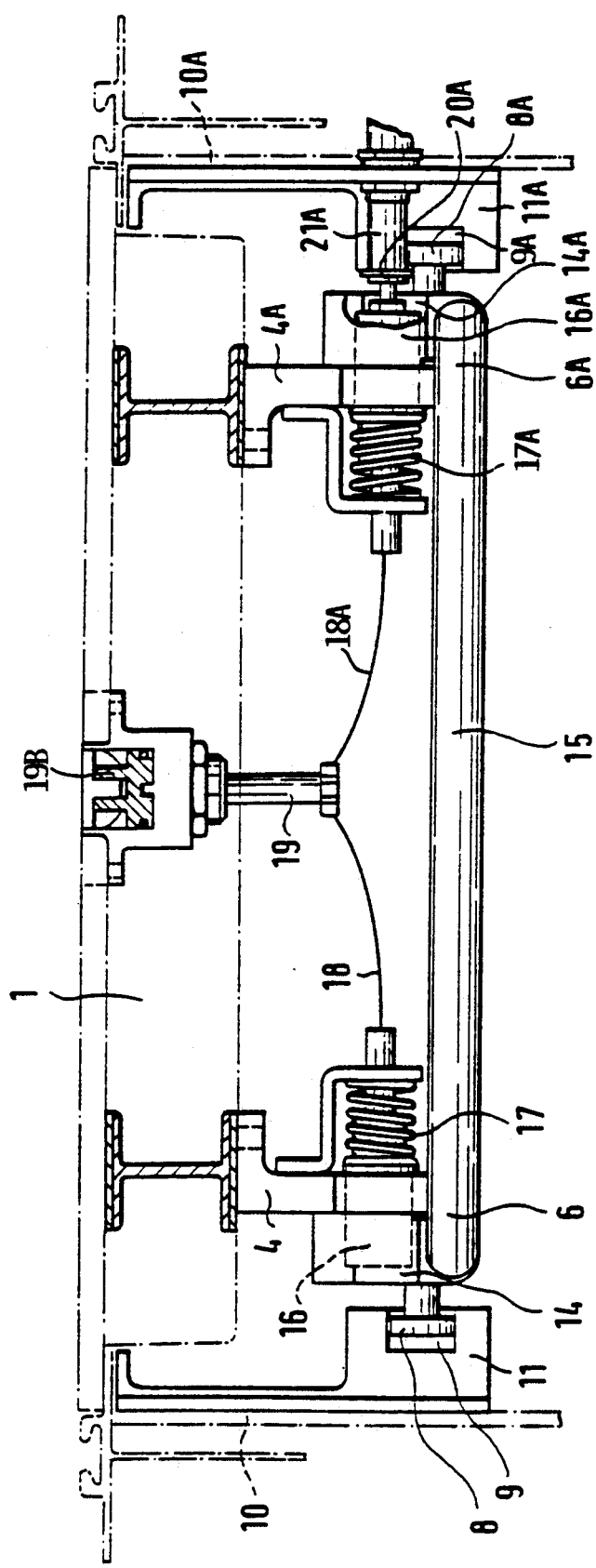
FIG. 2 is a sectional view along section line II—II of FIG. 1 showing both mirror-symmetrical locking mechanisms.

Referring to FIGS. 1 to 3 showing the principle of an apparatus for locking and unlocking a flap door, a hinge 2 with a hinging axis 2A secures the door 1 to an upper edge 3A of the deck 3 forming the floor of a passenger cabin in an aircraft. An apparatus for locking and unlocking the flap door 1 is attached on the inner side of the flap door 1, that is, on the side opposite the hinge 2, whereby both sections of the locking mechanism face downwardly into the space below the deck 3. Two bearing blocks 4, 4A are attached to the inner side of the flap door 1 for mounting the locking mechanisms. More specifically, one end of a bellcrank lever 5, see FIG. 1, is journalled or pivoted to the block 4, 4A. The bellcrank lever 5 is formed as a handle 6, 6A and carries a lateral roller 8, 8A which is attached to the handle 6, 6A with a small spacing 7 from the pivot or journal point on the bearing block 4. The roller 8, 8A engages into a guide groove 9, 9A as shown in the closed position depicted in FIGS. 1 and 2. The guide grooves 9, 9A are provided in a bracket 11, 11A that is laterally connected to a flap frame 10, 10A. These guide grooves 9, 9A run parallel to each other and to the upper edge 3A of the floor. Each guide groove has an entrance curve section 13 and a passage 12 for the entrance of the roller 8, 8A into the respective guide groove 9, 9A.

Furthermore, a spring-loaded locking member 14, 14A is attached to the bellcrank lever 5 forming the handle 6, 6A. In the closed position the locking members 14, 14A engage behind a respective stop member 16, 16A that is attached to the bearing block 4. The stop member 16 is biased by a spring 17, 17A and is coupled by a respective pulling member 18 with a setting or operating member 19, that is attached to the flap door 1 and that can be operated from the upper side of the deck 3. Thus, the flap door 1 can be operated from both sides. Furthermore, a releasing element 20A is provided on one side 10A of the door frame to cooperate with the locking member 14A. In the closed position of the flap door 1 the element 20A senses the presence of the locking member 14A in the door closed position and operates a proximity switch 21A to provide a signal for indicating the closed position of the flap door. The withdrawn state of the locking member 14A indicates that the door is not properly locked.

As can be seen in the depictions of FIG. 1 to FIG. 3, during the closing of the flap door 1, the roller 8 first reaches into the guide groove 9, until the locking member 14 finally contacts the stop member 16 and catches behind the stop member 16 by overcoming the biasing force of the springs 17, 17A. During opening, the operation proceeds in the opposite direction, that is, the spring biasing force exerted by the springs 17, 17A on the locking members 14, 14A must first be overcome by a downward swivelling of a bail 15 interconnecting the two handles 6 and 6A of the two locking mechanisms, one of which is attached to each of two opposite sides of the flap door 1. Once the biasing force has been overcome further swivelling of the bail 15 will open the flap door 1. The rollers 8, 8A thereby run out of the respective guide groove 9, 9A and are supported on the supporting edge that extends into or merges into the entrance curve section 13. Opening of the flap door 1 is therefore also possible, even if the flap door 1 is blocked on the upper side. To hinge the bellcrank lever to the bearing block 4, 4A, eccentric bearing sleeves can be used instead of the biasing spring, especially to compensate for manufacturing tolerances.

Should it be necessary, due to specific reasons, to open the flap door 1 from above, that is, from the passenger cabin, this is possible by turning the handle 19 provided in the flap door 1. The handle 19 is connected by pulling elements 18, e.g. cable sections, with the laterally slideable stop members 16, 16A, and therefore the locking or latch members 14 can be released by pulling back the stop members 16, 16A. The flap door 1 can then be opened from above.

Both locking mechanisms are mirror-symmetrically identical to each other as shown in FIGS. 2. The reference numbers for the elements of the right-hand locking mechanism have been provided with the letter A to distinguish these elements from the mirrorsymmetrically identical elements of the left-hand mechanism in FIG. 2.

In the closed position shown in all three figures, a latch member 14C shown in FIGS. 1 and 3 biased by a first spring 14B in the housing portion of the locking or latch member 14, 14A, engages a stop bar 16B of the stop member 16, 16A, preferably so that the latch member 14C reaches somewhat behind the stop bar 16B as best seen in FIG. 1. If the lever 6 is now pulled down turning counterclockwise in FIG. 1 around the journal sleeve 7B, the latch member 14C can retreat against the bias of its spring 14B, the roller rides up the ramp 13 and the lever arm 7 lifts the door sufficiently out of its frame 10 to hinge counterclockwise about its hinging axis 2A. This lift is sufficient for then fully opening the door either by pushing the bail 15 from below or by lifting from above as soon as the roller 8 aligns with the passage 12 to disengage from the guide groove 9 in the bracket 11.

Referring to FIG. 2, opening the door from above is accomplished by pulling or rotating the handle 19B, whereby the coupling elements 18, 18A disengage the stop bar 16B from the latch member 14C against the bias of the second springs 17, 17A, whereby the door can be lifted from above.

Although the invention has been described with reference to specific example embodiments it will be appreciated that it is intended to cover all modifications and equivalents within the scope of the appended claims.

What we claim is:

1. An apparatus for locking and unlocking a flap door located in a floor of a passenger cabin of an aircraft, said flap door leading to a space below the floor, comprising a door frame surrounding a door opening in said floor, at least one guide groove in said door frame, bearing block means (4, 4A) secured to said flap door, lever means for tilting said flap door upwardly out of said door frame, journal means (7B) for securing a first end of said lever means to said bearing block means, roller means journalled to said lever means at a spacing from said journal means, said roller means engaging said guide groove when said flap door is being closed and during part of a flap door opening motion by said lever means, said lever means having a second end forming a handle extending away from said roller means, a stop member (16) mounted to said bearing block, latch means (14) mounted to said lever means for engaging said stop member (16) when said flap door is closed, and a spring (14B) biasing said latch means (14) against said stop member (16).

2. The apparatus of claim 1, wherein said latch means (14) reach behind said stop member (16) in the door closed position.

3. The apparatus of claim 1, wherein said guide groove (9) is provided in a portion (11) of said door frame, said portion (11) being laterally connected in said door frame (10), said guide groove (9) running in parallel to said floor (3), said guide groove having an entrance curve (13) and a passage (12) permitting entry and exit of said roller means into and out of said guide groove.

4. The apparatus of claim 1, wherein said stop member (16) comprises a laterally slideable stop bar (16B) and further spring means (17) biasing said stop bar (16B) into engagement with said latch means (14), said apparatus further comprising an operating member (19) attached to said flap door (1) on its floor side and means (18) for coupling said operating member to said stop bar (16B) for disengaging said stop bar from said latch means to open said flap door from above said floor.

5. The apparatus of claim 4, further comprising a proximity switch positioned for cooperation with said stop bar (16B), said stop bar (16B) comprising a releasing element (20) which, in a closed position of said flap door (1), influences said proximity switch (21) to provide a signal regarding the flap door position.

6. The apparatus of claim 1, wherein said journal means (7B) comprise an eccentric bearing sleeve for hinging said first lever end (7) to said bearing block means (4) for compensating manufacturing tolerances.

7. The apparatus of claim 1, comprising two sets of mirror-symmetrical locking mechanisms each having its own bellcrank lever (5, 6) whereby two lever handles (6, 6A) are formed, said apparatus further comprising a bail (15) interconnecting said two lever handles for operating both locking mechanisms in unison with said bail (15).

* * * * *